May 20, 1958
R. E. DILLBERG ET AL
2,835,268
BUTTERFLY VALVE CONSTRUCTION
Filed Aug. 22, 1955
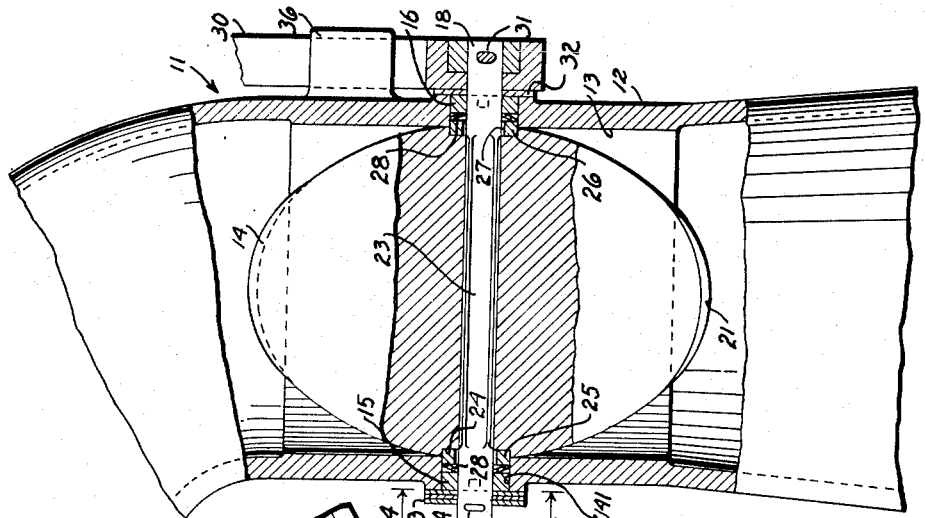
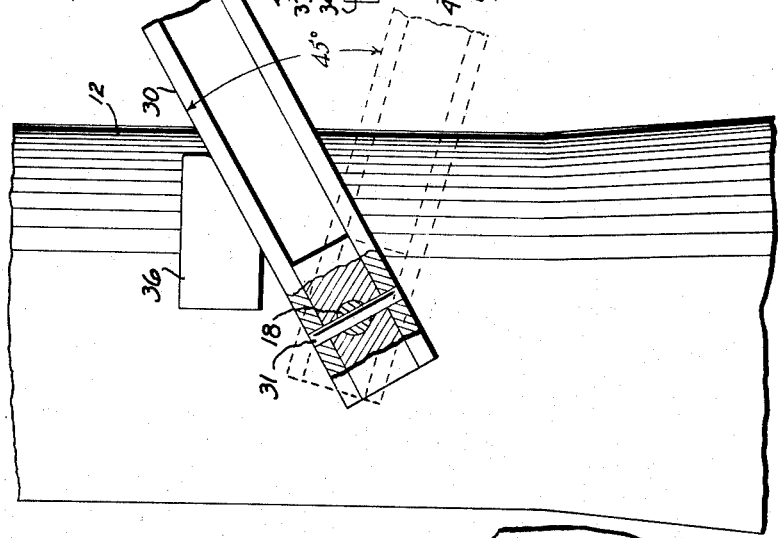
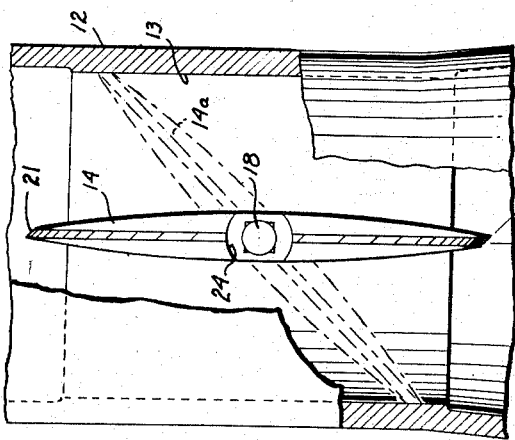
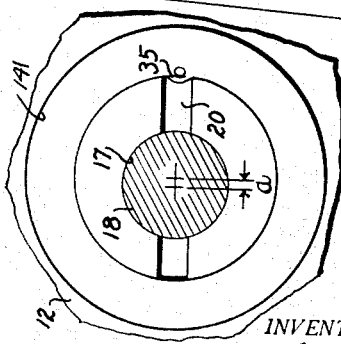
INVENTORS,
Raymond E. Dillberg
BY & James R. Garner
ATTORNEY.

United States Patent Office 2,835,268
Patented May 20, 1958

2,835,268

BUTTERFLY VALVE CONSTRUCTION

Raymond E. Dillberg, Temple City, and James R. Garner, Corona Del Mar, Calif., assignors to Clary Corporation, San Gabriel, Calif., a corporation of California Application August 22, 1955, Serial No. 529,805

2 Claims. (Cl. 137—315)

This invention relates to valves and has particular reference to valves of the so-called "butterfly" type wherein a valve element, in the form of a vane, is located within a fluid conduit member forming at least part of the valve casing. The valve element is supported for pivotal movement about an axis extending transversely to the flow of fluid through the conduit member.

Such valves have several advantages. For example, they permit quick opening and closing, they provide a relatively small impedance to the fluid flow when in open condition, they are balanced against the force of fluid pressure when in closed condition, and they are relatively inexpensive to manufacture. However, the main drawback to such valves is that heretofore such valves could not be commercially manufactured without an excessive leakage rate when in closed condition. This was occasioned by problems involved in constructing the valve and particularly in locating the pivotal axis of the valve and its bearing relative to the conduit member.

A principal object of the present invention, therefore, is to provide a butterfly type valve having a minimum leakage rate when in closed condition.

Another object is to provide an adjustment for a butterfly type valve wherein the valve element can be adjusted to properly seat throughout the major portion of its sealing surface.

Another object is to reduce the leakage rate of a butterfly type valve in the neighborhood of the pivotal support for the valve element.

Another object is to provide an adjustable butterfly type valve which is simple and economical to manufacture.

The manner in which the above and other objects of the invention are accomplished will be readily understood on reference to the following specification when read in conjunction with the accompanying drawings, wherein:

Fig. 1 is a front view, partly in section, showing a valve of the butterfly type embodying a preferred form of the present invention.

Fig. 2 is a side view, partly in section, of the valve.

Fig. 3 is a side view similar to Fig. 2 but in further section.

Fig. 4 is a transverse sectional view taken along the line 4—4 of Fig. 1 illustrating part of the eccentric adjustment.

The valve, generally indicated at 11, comprises a conduit member 12 which is connected in a manner not shown to a source of fluid supply, the flow of which is controlled by the valve. The member 12 has an accurately machined cylindrical inner bore surface 13 against which valve element 14 is seated when the valve is closed.

Coaxially arranged and diametrically opposed bearings 141 are formed in the valve to receive eccentric bushings 15 and 16 rotatably mounted therein. The latter bushings have eccentrically located bearings 17 therein in which is rotatably mounted a valve shaft 18. The amount of eccentricity is relatively small. For example, in a valve having a three inch diameter throat it has been found that with the usual production tolerances, the distance "a" (Fig. 4) between the centers of the valve housing bearing and bushing bearing need be only on the order of .003 inch in order to effect proper adjustment of the valve to correct for any inaccuracies. Radially extending slots 20 are formed in the outer faces of the bushings in order to permit the use of a suitable spanner tool, not shown, to independently and rotatably adjust the bushings 15 and 16.

The valve element 14 is elliptical as viewed in Fig. 1 so that when rotated 45° from its vertical position shown in full lines in Fig. 3 and into its dot and dash lines 14a, it will seat upon the inner bore 13 of the member 12. In order to effect proper sealing, the valve is provided with a sealing surface 21 comprising a band of material thickness extending around its circumference and so shaped that its surface will extend cylindrically in complementary relation to the bore 13.

The valve element 14 has a hole extending centrally therethrough of square cross section which is slideably fitted over a center section 23 of square cross section formed on the shaft 18. The opposite sides of the valve are counterbored at 24 to receive sealing bushings 25 and 26. These bushings fit snugly within the counterbored sections 24 and within the bearings 141, and each has an enlarged hole 27 which clears the shaft 18 in any relatively adjusted positions of the eccentric bushings 15 and 16.

Compression spring washers 28 are compressed between adjacent ones of the eccentric bushings and the sealing bushings, i. e. between bushings 15 and 25, and are effective to urge the sealing bushings into sealing engagement with the sides of the valve to thereby reduce leakage of fluid from within the conduit member and along the surface of the shaft 23.

An actuating arm 30 is attached by a pin 31 to one end of the shaft 18, there being a spacer or washer 32 (forming a sealing element) located between the arm and the adjacent side of the conduit member. A plurality of three spacers or washers 33 are slideably mounted over the opposite end of the shaft 18 and are retained in engagement with the adjacent side of the housing by a pin 34 extending through the shaft. The inner one of the washers 33 thus forms a second sealing element.

Although the three washers 33 are illustrated as being of the flat, plane type, the center washer may, in certain embodiments, be a compressed spring, similar to spring washers 28, so as to yieldably urge the shaft 18 to the left, in Fig. 1, and thus exert a spring pressure holding the inner one of the washers 33 and the washer 32 against the respective sides of the member 12. This feature will further aid in reducing leakage and in retaining the shaft in place in a longitudinal direction.

In adjusting the valve, the arm 30 and spacers 32 and 33 are removed from the shaft 18, and the valve element 14 is closed. The eccentric bushings 15 and 16 are independently and rotatably adjusted until a minimum amount of fluid leakage is observed. This feature enables adjustment of the valve element 14 in almost any direction in its mean plane except in a direction parallel to the shaft 18 so as to correct for any inaccuracy or misalignment of the parts. After obtaining an optimum adjustment, the eccentric bushings are locked in place by prick punching the edges of the bearings 141 directly opposite the slots 20, as indicated at 35 (Fig. 4) so as to deform a minute amount of metal into the slots. Thereafter, the arm 30 and spacers 32 and 33 are replaced on the shaft in such a manner that when the valve is in its fully open position, the arm 30 will rest against a stop lug 36 extending from the conduit member 12.

Although we have described our invention in detail and have therefore used certain terms and languages herein, it is to be understood that the present disclosure is illustrative rather than restrictive and that changes and modifications may be made without departing from the spirit or scope of the invention as set forth in the appended claims.

Having thus described the invention what we desire to secure by United States Letters Patent is:

1. A valve comprising a tubular conduit member having opposed bearings therein, eccentric bushings rotatably adjustable in said bearings, said bushings having eccentrically located bearings therein, a valve shaft rotatably mounted in said last mentioned bearings, a disc-like valve element mounted on said shaft intermediate said bearings, said valve element being adapted to seat against the inner surface of said conduit member when in closed condition, sealing bushings slideably mounted in said first mentioned bearings intermediate said eccentric bushings and the adjacent sides of said valve element, said sealing bushings having openings therein through which said shaft extends, each of said openings being of a size sufficiently greater than the cross sectional size of said shaft to provide clearance therebetween in all adjusted positions of said eccentric bushings, and springs compressed between adjacent ones of said eccentric bushings and said sealing bushings urging said sealing bushings into fluid sealing engagement with the sides of said valve element.

2. A valve comprising a tubular conduit member having opposed bearings theerin, eccentric bushings rotatably adjustable in said bearings, said bushings having eccentrically located bearings therein, a valve shaft rotatably mounted in said last mentioned bearings, a disc-like valve element on said shaft intermediate said bushings, said valve element being adapted to seat against the inner surface of said conduit member when in closed condition, and sealing bushings slideably mounted in said first mentioned bearings intermediate said eccentric bushings and the adjacent sides of said valve element, said sealing bushings engaging said sides and having openings therein through which said shaft extends, each of said openings being of a size sufficiently greater than the cross sectional size of said shaft to provide clearance therebetween in all adjusted positions of said eccentric bushings.

References Cited in the file of this patent
UNITED STATES PATENTS

| | | |
|---|---|---|
| 1,296,922 | Clairmont | Mar. 11, 1919 |
| 1,442,452 | Taylor | Jan. 16, 1923 |
| 2,054,369 | Francis | Sept. 15, 1936 |
| 2,552,117 | Roswell | May 8, 1951 |